United States Patent Office 3,463,744
Patented Aug. 26, 1969

3,463,744
CONTROL OF ACID ACTIVITY OF A HYDROCARBON CONVERSION CATALYST COMPRISING A HALOGEN COMPONENT COMBINED WITH A SUPPORT CONTAINING ALUMINA AND CRYSTALLINE ALUMINOSILICATE PARTICLES
Roy T. Mitsche, Island Lake, Ill., assignor to Universal Oil Products Company, Des Plaines, Ill., a corporation of Delaware
No Drawing. Continuation-in-part of application Ser. No. 517,845, Dec. 30, 1965. This application June 3, 1968, Ser. No. 733,799
Int. Cl. B01j 11/40, 11/78
U.S. Cl. 252—442
9 Claims

ABSTRACT OF THE DISCLOSURE

A hydrocarbon conversion catalyst comprising a halogen component combined with a support containing alumina and finely divided crystalline aluminosilicate particles is prepared and the acid activity of the resulting catalyst is simultaneously controlled, by the steps of: (a) commingling finely divided crystalline aluminosilicate particles with an aluminum hydroxyl halide sol to form a mixture thereof, (b) gelling the resultant mixture to form a hydrogel, and (c) calcining the resultant hydrogel for a period of about 1 to about 5 hours at a constant calcination temperature selected from the range of about 500° C. to about 800° C. in inverse relation to the amount of acid activity required. Principal utility of the resultant catalyst is in the area of acid-catalyzed hydrocarbon conversion reactions such as cracking, alkylation, polymerization, etc., where the acid strength of the catalyst must be carefully controlled in order to limit side reactions and avoid excessive catalyst deactivation. In addition, the catalyst can be combined with a Group VI or Group VIII metallic component and utilized to accelerate a wide variety of reactions of the type which have heretofore utilized dual-function catalysts such as hydrocracking, reforming, isomerization, etc., wherein the acid function of the catalyst must be carefully balanced against the hydrogenation-dehydrogenation function.

CROSS-REFERENCE TO RELATED APPLICATION

This application is a continuation-in-part of my application Ser. No. 517,845, filed Dec. 30, 1965 and now abandoned.

DISCLOSURE

The subject of the present invention is a method for preparing a hydrocarbon conversion catalyst containing a crystalline aluminosilicate and for simultaneously regulating the acid activity associated therewith. More specifically, the present invention provides a method of controlling the acid activity of a catalyst comprising a halogen component combined with a support containing alumina and finely divided crystalline aluminosilicate particles. In another aspect, the present invention relates to a method of controlling the acid activity of a catalyst comprising a platinum group component and a halogen component composited with a support containing alumina and mordenite, when the catalyst is utilized for the conversion of hydrocarbons and, particularly, in a process for the conversion of a gasoline fraction to LPG and a high octane reformate.

The concept of the present invention resulted from my investigations into a hydrogen-balancing problem that frequently attends the utilization of a recently discovered dual-function hydrocarbon conversion catalyst (which is prepared in a particular manner and comprises a platinum group component and a halogen component combined with a support containing alumina and mordenite) in a process for the production of LPG and a high octane reformate. This hydrogen balancing problem stems from the desire to run this process so that the hydrogen make from the hydrogen-producing reactions associated with the high octane reformate production function of this catalyst are balanced against the hydrogen-consuming reactions associated with the selective hydrocracking to LPG function of the catalyst. Depending upon the particular characteristics of the charge stock utilized in this process, it was observed that in many cases this catalyst system, while it did perform its LPG-making function and high octane reformate producing function in a highly successful manner, was unable to sustain hydrogen production because of excessive acid activity of the catalyst which unbalanced the set of reactions toward the hydrogen-consuming reactions. In effect, the problem of operating this type of process under conditions that result in a net hydrogen make for a specified charge stock was the starting point for my investigations. As a result of these investigations, I have now determined not only how to solve the hydrogen balancing problem associated with this LPG production process, but more basically, I have found that for a catalyst comprising a halogen component combined with a support containing alumina and a crystalline aluminosilicate, which catalyst is made in a particular manner resulting in a synergistic increase in its acid activity, the amount of inherent acid activity is a pronounced function of the calcination temperature utilized in its manufacture. More precisely, I have discovered that the amount of acid activity of this type of catalyst is dependent upon the inverse of the calcination temperature used in the preparation thereof. Accordingly, the present invention provides a convenient method for preparing a highly active hydrocarbon conversion catalyst and simultaneously adjusting, or tailor-making the catalyst to fit a specific acid activity requirement; for example, in the LPG production process mentioned above, the present invention allows the acid activity of the catalyst to be regulated as a function of the characteristics of the charge stock to insure that the hydrogen consumption reactions are balanced against the hydrogen production reactions, thereby enabling this process to be operated to fulfill a precise hydrogen production requirement.

Solid catalysts having a propensity to accelerate so-called acid-catalyzed reactions are widely used today in many industries within the petroleum and chemical arts to accelerate a wide spectrum of hydrocargon conversion reactions. In many applications these catalysts are used by themselves to accelerate the reactions which mechanically are thought to proceed by carbonium ion intermediates such as a catalytic cracking, alkylation, dealkylation, polymerization, etc. In other applications acidic catalysts are combined with a hydrogenation-dehydrogenation metallic component to form a dual-function catalyst having both a cracking function and a hydrogenation-dehydrogenation function. In this latter case, the cracking function is generally thought to be associated with an acid-acting material of the porous, adsorptive, refractory oxide-type which is typically utilized as the support or carrier for a heavy metal component such as the metals or compounds of metals of Group VI or Group VIII of the Periodic Table to which the hydrogenation-dehydrogenation function is generally attributed.

Heretofore the acid or cracking function has been typically provided by a wide variety of materials such as alumina, silica-alumina, silica-magnesia, silica gels, phosphates, various types of amorphous clays, acid-treated alumina, halogen containing alumina and other various types of mterials known to the art to exhibit so-called acidic sites on their surfaces. Recently, there has appeared a new variety of materials that are capable of providing this function which materials are generally characterized as crystalline aluminosilicates. In my prior filed application, I disclosed a method for combining crystalline aluminosilicates with a halogen-containing alumina material to produce a catalyst having an acidic function which is substantially greater than the sum of the acidity contributed by the halogen-containing alumina alone and the crystalline aluminosilicate alone. More particularly, I found that by combining the crystalline aluminosilicate with an aluminum hydroxyl halide sol and then forming the resultant mixture into particles of any desired shape that these particles possess the ability to catalyze acid reactions which is sharply increased relative to that exhibited by a physical mixture of these components having exactly the same composition. In addition, I observed that it is an essential requirement for the production of this synergistic effect that the sol utilized be an alumina hydroxyl halide sol and, more particularly, an aluminum hydroxyl chloride sol so that the resulting catalytic composite contains a halogen component.

As indicated briefly above, the present invention is based on a finding that the calcination temperature utilized to prepare the synergistic composition of halogen, alumina and crystalline aluminosilicate described above provides a convenient means for regulating the amount of acid activity associated with the resulting catalyst. Accordingly, the present invention provides a convenient means for tailor-making a catalyst of the type described above to fit a specific acid strength requirement which can be derived in a number of ways, the most practical being a series of experiments with the particular reactants to be utilized in the hydrocarbon conversion reaction with the present invention being used to prepare a series of catalysts of varying acid activity. It requires only a minor amount of experimental activity, therefore, for a person of ordinary skill in the art to determine the optimum acid strength for the particular reactants and hydrocarbon conversion reaction of interest. The central point of the present invention involves recognition that the acid activity of this catalyst can be adjusted by varying the calcination temperature and thus provides a convenient means for optimizing the particular application of interest. In particular, in a process for the production of LPG and a high octane reformate which utilizes the catalyst described above, the present invention provides a convenient means for adjusting the acid strength of the catalyst as a function of the nature of the charge stock of interest in order to select a catalyst having enough acid activity to produce substantial quantities of LPG, and yet a catalyst that will remain in hydrogen balance.

The catalyst formed by the method of the present invention can be used with or without metallic components to accelerate a wide variety of hydrocarbon conversion reactions such as cracking, hydrocracking, isomerization, dehydrogenation, hydrogenation, desulfurization, cyclization, alkylation, polymerization, dealkylation, transalkylation, hydroisomerization, reforming for LPG, etc.

In one embodiment, accordingly, the present invention provides a method for preparing a hydrocarbon conversion catalyst comprising a halogen component combined with a support containing alumina and finely divided crystalline aluminosilicate particles and for simultaneously controlling the acid activity of the resulting catalyst. The method comprises the steps of: (a) commingling finely divided crystalline aluminosilicate particles with an aluminum hydroxyl halide sol to form a mixture thereof, (b) gelling the resultant mixture to obtain a hydrogel, and (c) calcining the resulting hydrogel for a period of about 1 to about 5 hours at a constant calcination temperature selected from the range of about 500° C. to 800° C. in inverse relation to the amount of acid activity required.

In a second embodiment, the present invention relates to the catalyst produced by the method outlined above wherein a metallic component is combined therewith after the calcination step to produce a dual-function hydrocarbon conversion catalyst, and the resulting catalyst is subjected to an oxidation treatment followed by a reduction treatment both of which are conducted at a temperature at least 25° C. lower than the calcination temperature utilized in step (c).

A third embodiment comprises the method described in the first embodiment wherein the crystalline aluminosilicate is mordenite and the sol is an aluminum hydroxyl chloride sol having a weight ratio of aluminum to chloride of about 1:1 to about 1:1.4.

Another embodiment relates to a method for preparing a hydrocarbon conversion catalyst comprising about 0.01 to about 3 weight percent of chlorine combined with a support containing alumina and finely divided crystalline aluminosilicate particles and for simultaneously controlling the acid activity of the resulting catalyst. The method involves the following steps: (a) commingling finely divided crystalline aluminosilicate particles with an aluminum hydroxyl chloride sol to form a mixture thereof, (b) gelling the resultant mixture to form substantially spherical hydrogel particles, (c) aging, washing, and drying the resulting hydrogel particles and (d) calcining the particles from step (c) for a period of about 1 to about 5 hours at a constant calcination temperature selected from the range of about 500° C. to 800° C. in inverse relation to the amount of acid activity required.

Other objects and embodiments relate to the details regarding the precise nature of the steps utilized in forming the catalyst, the nature of the catalytic components, the concentration of the components in the catalyst, the processes that the catalyst can be utilized in, and the like particulars which are hereinafter given in the following detailed discussion of each of these facets of the present invention.

As indicated above, the catalyst of interest comprises a halogen component combined with a support containing alumina and crystalline aluminosilicate particles. In addition, in some cases the catalyst may be combined with a sulfur component and/or metallic component selected from the metals and compounds from Group VI and VIII of the Periodic Table. Considering first the alumina utilized, it is preferred that the alumina be a porous, adsorptive, high surface area material having a surface area of about 25 to about 500 or more meter sq./gram. Suitable alumina materials are the crystalline aluminas known as gamma-, eta-, and theta-alumina, with gamma-alumina giving best results.

It is an essential feature of the present invention that the alumina support contains finely divided crystalline aluminosilicate particles. As is well-known to those skilled in the art, crystalline aluminosilicates (also known as "zeolites" and "molecular sieves") are composed of a three-dimensional interconnecting network structure of silica and alumina tetrahedra. The tetrahedra are formed by four oxygen atoms surrounding a silicon or aluminum atom, and the basic linkage between the tetrahedra are through the oxygen atoms. These tetrahedra are arranged in an ordered structure to form interconnecting cavities or channels of uniform size interconnected by uniform openings or pores. The ion-exchange property of these materials follows from the trivalent nature of aluminum which causes the alumina tetrahedra to be negatively charged and allows the association of cations with them in order to maintain an electrical balance in the structure. The molecular sieve property of these materials follows from the uniform size of the pores thereof which pore size can be related to the size of molecules and used to remove, from a mixture of molecules, the molecules having a critical diameter less than or equal to the diameter of the pore mouths. For purposes of the present invention, it is preferred to use crystalline aluminosilicates having pore mouths of about 5 angstroms in cross-sectional diameter and more preferably about 5 to about 15 angstrom units. Ordinarily, the aluminosilicates are synthetically prepared in the alkali metal form with one alkali metal cation associated with each aluminum centered tetrahedra. This alkali metal cation may be thereafter ion-exchanged with polyvalent cations such as calcium, magnesium, beryllium, rare earth cations, etc. Another treatment of these alkali metal aluminosilicates involves ion-exchange with ammonium ions followed by thermal treatment, preferably above 300° F. to convert to the hydrogen form. When the crystalline aluminosilicate contains a high mole ratio of silicon to alumina (for example, above 5) the material may be directly converted to an acid form in a suitable acid medium.

Although in some cases the polyvalent form of the aluminosiloicate may be used in the present invention, it is preferred to use the hydrogen form or a form such as the alkali metal form, which is convertible to the hydrogen form during the course of the essential incorporation procedure discussed below.

The preferred crystalline aluminosilicate for use in the present invention are the hydrogen and/or polyvalent forms of synthetically prepared faujasite and mordenite. In fact, I have found best results with synthetic mordenite having an effective pore diameter of about 4 to about 6.6 angstrom units and a mole ratio of silica to alumina of about 9 to 11. As is well known to those skilled in the art, mordenite differs from other known crystalline aluminosilicates in that its crystal structure is believed to be made up of chains of 5-member rings of tetrahedra which apparently are arranged to form a parallel system of channels having diameters of about 4 to 6.6 angstroms interconnected by smaller channels having a diameter of about 2.8 angstroms. Mordenite is characterized by the following formula:

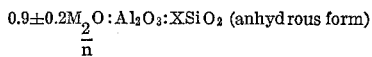

wherein M is a cation which balances the electrovalences of the tetrahedra, $n$ is the valence of M, and X is a constant generally ranging in value from 9 to 11 and usually about 10. These synthetic mordenite type zeolites are available from a number of sources, one being the Norton Company of Worcester, Mass.

Regarding the method of incorporating the crystalline aluminosilicate particles into the alumina support, it is an essential feature of the present invention that the crystalline aluminosilicate particles are added directly to an alumina hydroxyl halide sol prior to the sol being gelled. Although in some cases sols formed with fluorine, bromine, or iodine, may be satisfactory I have found best results are obtained with an aluminum hydroxyl chloride sol formed by dissolving substantially pure aluminum metal in a hydrochloric acid to result in a sol having a weight ratio of aluminum to chloride of about 1:1 to about 1.4:1. Additionally, it is preferred that the sol have a pH of about 3 to about 5. One advantage of this feature of the present invention is the realtive ease with which the crystalline aluminosilicate particles can be uniformly distributed in the resulting catalyst. Additionally, the halogen present in the sol provides a halogen component in the resulting catalyst. However, the most important advantage is that the sol appears to react with the crystalline aluminosilicate, causing some basic modification of its structure which enables the resulting support to have unusual acid activity or the ability to catalyze reactions which depend on carbonium ion intermediates such as cracking alkylation, isomerization, polymerization, etc. and particularly hydrocracking to $C_3$ and $C_4$ fragments. Moreover, I have now found that the extent of the enhancement in acid activity produced by this procedure can be regulated and controlled by calcination temperature utilized in a subsequent calcination step.

Accordingly, it is an essential feature of the present invention that the catalyst thereof is produced by the following steps: commingling finely divided crystalline aluminosilicate particles with an aluminum hydroxyl halide sol to form a mixture thereof; gelling the resultant mixture to produce a hydrogel or particles of a hydrogel; and thereafter calcining the resulting hydrogel for a period of about 1 to about 5 hours at a constant calcination temperature selected from the range of about 500° C. to about 800° C. in inverse relation to the amount of acid activity required. For purposes of the present invention, the catalyst may be formed in any desired shape such as spheres, pellets, pills, cakes, extrudates, powders, granules, etc. However, a particularly preferred form of the catalyst is the sphere; and spheres may be continuously manufactured by the well-known oil drop method which comprises forming an alumina hydrosol, preferably by reacting aluminum metal with hydrochloric acid, combining the hydrosol with a suitable gelling agent such as hexamethylenetetramine to form a dropping solution, uniformly distributing finely divided crystalline aluminosilicate particles throughout the dropping solution, and dropping the resultant mixture into an oil bath maintained at elevated temperatures. Alternatively, the particles may be commingled with the sol to form a mixture thereof and the gelling agent thereafter added to the mixture to form the dropping solution. In either case, the droplets of the mixture remain in the oil bath until they set and form substantially spherical hydrogel particles. The spheres are then continuously subjected to specific aging treatments in oil and an ammoniacal solution to further improve their physical characteristics. The resulting aged and gelled particles are then washed and dried at a relatively low temperature of about 150° C. to about 205° C. and subjected to calcination for a period of about 1 to about 5 hours at a constant calcination temperature selected from the range of about 500° C. to about 800° C. in inverse relation to the amount of acid activity required. This treatment effects conversion of the alumina hydrogel to the corresponding crystalline gamma-alumina. See U.S. Patent No. 2,620,314 for additional details regarding this oil drop method.

The amount of crystalline aluminosilicate in the resulting alumina support is preferably about 0.5 to about 20 weight percent thereof, and, more particularly, when using mordenite about 2.0 to about 10.0 weight percent. By the expression "finely divided" it is meant that the crystalline aluminosilicate is used in a particle size having an average diameter of about 1 to about 100 microns, with best results obtained with particles of average diameter of less than 40 microns.

An essential component of the catalyst of the present invention is the halogen component. Although the precise form of the chemistry of the association of the halogen component with the aluminum support is not entirely known, it is customary in the art to refer to the halogen component as being combined with the alumina support, or with the other ingredients of the catalyst. This combined halogen may be either fluorine, chlorine, iodine, bromine, or mixtures thereof. Of these, fluorine and particularly chlorine are preferred for the purposes of the present invention. As indicated above, a halogen component is inherently incorporated in the catalyst during preparation thereof. If desired, additional halogen may be added to the calcined catalyst as an aqueous solution of an acid such as hydrogen fluoride, hydrogen chloride, hydrogen bromide, etc. Moreover, an additional amount of the halogen component may be composited with a catalyst during the impregnation of the latter with a metallic component; for example, through the utilization of a mixture of chloroplatinic acid and hydrogen chloride. In any event, the halogen component is combined with the support in amounts sufficient to result in a final catalyst which contains about 0.01 to about 3 weight percent and preferably about 0.1 to about 1.0 weight percent halogen calculated on an elemental basis.

In many cases, the catalyst produced by the method outlined above is conveniently combined with a metallic component selected from the metals or compounds of metals of Group VI and Group VIII of the Periodic Table to form a dual-function catalyst. The preferred metallic components comprise nickel, palladium, and platinum, with a platinum component giving best results. The metallic component, such as platinum, may exist within the final catalytic composite as a compound such as an oxide, sulfide, halide, or in an elemental state. Generally, the amount of the metallic component present in the final catalyst is small compared to the other components combined therewith. In fact, when the metallic component is a platinum group component, it generally comprises about 0.05 to about 1.5 weight percent of the final catalytic composite calculated on an elemental basis. In the case where the metallic component is a non-noble metal such as nickel, molybdenum, or tungsten, the preferred concentration is about 0.5 to about 40 weight percent of the final dual-function catalyst calculated on an elemental metal basis.

The metallic component may be incorporated in the catalytic composite in any suitable manner such as ion-exchange and/or impregnation with a suitable solution of the metallic component. However, it is an essential feature of the present invention that the metallic component is combined with the catalyst prepared by the method of the present invention after the calcination step described above. Accordingly, the preferred method of preparing a dual-function catalyst comprising a metallic component combined with the catalyst prepared by the method outlined above, involves the utilization of water soluble compounds of the metallic component to impregnate the calcined catalyst. For example, a platinum group metal may be added to the support by commingling the latter with an aqueous solution of chloroplatinic acid.

Regardless of the details of how the metallic component of the catalyst is combined with the catalyst, the resulting dual-function catalyst generally will be dried at a temperature of from about 200° F. to about 600° F. for a period of from about 2 to 24 hours or more and finally oxidized at a temperature at least 25° C. lower than the calcination temperature used in the hydrogel calcination steps for a period of about 0.5 to about 10 hours, and preferably about 1 to about 5 hours.

It is preferred that the resultant oxidized dual-function catalytic composite be subjected to reduction conditions prior to its use in the conversion of hydrocarbons. This step is designed to insure a uniform and finely divided disperison of the metallic component throughout the carrier material. Preferably, substantially pure and dry hydrogen is used as the reducing agent in this step. The reducing agent is contacted with the calcined catalyst at a temperature at least 25° C. lower than the calcination temperature used in the hydrogel calcination step, and for a period of time of about 0.5 to 10 hours or more effective to substantially reduce platinum group component to its elemental state. This reduction treatment may be performed in situ as part of a start-up sequence if desired.

Although it is not essential, the resulting reduced dual-function catalyst is preferably subjected to a presulfiding operation designed to incorporate in the catalytic composite from about 0.05 to about 0.50 weight percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component.

The catalysts prepared by the method of the present invention find utility in processes for the conversion of hydrocarbons. Generally, in these processes a hydrocarbon is contacted with a catalyst of the type described above in a hydrocarbon conversion zone at hydrocarbon conversion conditions. This contacting may be accomplished by using the catalyst in a fixed bed system, a moving bed system, a fluidized bed system, or in a batch type operation; however, in view of the danger of attrition losses of the valuable catalyst and of well-known operation advantages, it is generally preferred to use a fixed bed system.

In the cases where the dual-function catalyst of the present invention is used in a reforming process or a process for the production of LPG and a high octane reformate, the conversion system will comprise a conversion zone containing a fixed bed of the catalyst. This conversion zone may be one or more separate reactors with suitable heating means therebetween to compensate for the endothermic nature of the reactions that take place in each catalyst bed. The hydrocarbon feed stream that is charged to this conversion system in the reforming and LPG-production embodiments will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines and the like. On the other hand, it is frequently advantageous to charge thermally or catalytically cracked gasolines or higher boiling fractions thereof, called heavy naphthas. In some cases, it is also advantageous to charge pure hydrocarbons or mixtures of hydrocarbons that have been extracted from hydrocarbon distillates—for example, straight-chain paraffins—which are to be converted to aromatics. It is preferred that these charge stocks be treated by conventional catalytic pretreatment methods to remove at least a portion of the sulfurous, nitrogenous and water-yielding contaminants therefrom.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane-rich stock, or an n-hexane-rich stock, etc. In hydrocracking embodiments, the charge stock will be typically a gas oil, heavy cracked cycle oil, etc. In addition, alkyl aromatics can be conveniently isomerized by using the catalyst of the present invention. Likewise, pure hydrocarbons or substantially pure hydrocarbons can be converted to more valuable products by using the catalyst of the present invention in any of the hydrocarbon conversion processes, known to the art, that use either an acidic catalyst or a dual-function catalyst.

In the reforming and LPG-production embodiments, an effluent stream is withdrawn from the conversion zone and passed through a condensing means to a separation zone, typically maintained at about 50° F. wherein a hydrogen-rich gas is separated from a high octane liquid product, commonly designated as a reformate. Preferably, at least a portion of this hydrogen-rich gas is withdrawn from the separating zone and is then recycled through suitable compressing means back to the conversion zone. The liquid phase from the separating zone is then typically withdrawn and commonly treated in a fractionating system in order to recover LPG (i.e. liquefied petroleum gas) and other light ends and to produce a high octane reformate.

The conditions utilized in the numerous hydrocarbon conversion reactions in which the catalyst prepared by the method of the present invention can be used, are those customarily used in the art for the particular reaction, or combination of reactions, that is to be effected. For instance, alkylaromatic isomerization conditions include: a temperature of about 32° F. to about 1000° F.;

a pressure at atmospheric to about 1500 p.s.i.g.; hydrogen to hydrocarbon mole ratio of about 0.5:1 to about 20:1, and a LHSV (calculated on the basis of equivalent liquid volume of the charge stock contacted with the catalyst per hour divided by the volume of conversion zone containing catalyst) of about 0.5 hr.$^{-1}$ to 20 hr.$^{-1}$. Typical alkylation conditions comprise: a temperature of about 32° F. to 800° F., a pressure of about atmospheric to about 200 p.s.i.g., a LHSV of about 1 to 20 hr.$^{-1}$. Likewise, typical hydrocracking conditions include: a pressure of about 400 p.s.i.g. to about 3000 p.s.i.g.; a temperature of about 400° F. to about 900° F.; a LHSV of about 0.1 hr.$^{-1}$ to about 10 hr.$^{-1}$; and hydrogen circulation rates of 1,000 to 10,000 s.c.f. per barrel of charge.

Conditions utilized in the embodiment of the present invention when substantial quantities of LPG and a high octane reformate are to be produced include: a pressure of about 400 to about 600 p.s.i.g., a temperature of about 800 to about 1050° F., a LHSV of about 0.5 to 5.0 hr.$^{-1}$ and a hydrogen to hydrocarbon mole ratio of about 5:1 to 15:1.

The following examples are given to illustrate further the present invention. It is understood that the examples are given for the sole purpose of illustration and are not to be considered to limit unduly the generally broad scope and spirit of the appended claims.

EXAMPLE I

Aluminum metal, having a purity of 99.99 weight percent is digested in hydrochloric acid to produce an aluminum hydroxyl chloride sol containing 10.2 weight percent Cl and 11.7 weight percent Al and having a weight ratio of Al/Cl of about 1.15 and a specific gravity of 1.425 at 60° F. An aqueous solution containing 28 weight percent HMT (i.e. hexamethylene tetraamine), is made up and 700 cc. of the HMT solution is added to 700 cc. of the sol and thoroughly mixed to form a dropping solution. About 10 grams of the hydrogen form of synthetic mordenite obtained from the Norton Company in the form of a fine powder is commingled with the dropping solution and uniformly dispersed therein. Another portion of the synthetic mordenite is analyzed for particle size distribution which shows that 57.6 weight percent of the powder is between 0 and 20 microns in size, 69.5 weight percent of the powder is between 0 and 40 microns in size and 82.1 weight percent of the powder is between 0 and 60 microns in size.

The dropping solution containing the dispersed synthetic mordenite is passed through a vibrating dropping head and dropped in discrete spherical particles into a forming oil maintained at 95° C. The rate of vibration and the volumetric flow of dropping solution are controlled to produce finished spherical particles of about 1/16 of an inch in diameter. The dropped hydrogel spheres are aged in oil overnight (about 16 hours), separated from the oil and aged in an ammonia solution at 95° F. for about 3 hours. The aged spherical particles are then water washed to remove neutrlization salts and dried at 200° C. The dried particles are then screened and divided into 5 equal portions of 300 cc. each and these portions are then separately subjected to a calcination step with air containing 3% $H_2O$ at a gas hourly space velocity of 720 hr.$^{-1}$ and at the conditions shown in Table I. The physical properties of the resultant calcined particles are also shown in Table I.

TABLE I.—CONDITIONS AND RESULTS FOR CALCINATION STEP

| Batch No. | Calcination conditions | | Physical properties of calcined particles | | | |
|---|---|---|---|---|---|---|
| | Temp., °C. | Time, hr. | ABD, gm./cc. | Surface area, m.²/gm. | Pore volume, ml./gm. | Pore diameter, A. |
| 1 | 550 | 2 | .375 | 227 | .43 | 76 |
| 2 | 600 | 2 | .370 | 207 | .42 | 81 |
| 3 | 650 | 2 | .380 | 185 | .42 | 91 |
| 4 | 700 | 2 | .370 | 171 | .39 | 91 |
| 5 | 750 | 2 | .370 | 157 | .38 | 97 |

Chemical analysis of the resulting calcined particles indicate that they all contain about 5 weight percent mordenite and about 0.2 weight percent chloride.

A sample from each of the resulting batches is then separately subjected to a testing procedure designed to determine their reactive acid activity. In this procedure, the samples are pretreated by outgassing at 550° C. for one-half hour. After outgassing, the samples were subjected to ammonia gas at one atmosphere for 10 minutes at 400° C., then outgassed at 400° C. for one-half hour. The ammonia remaining in the sample was analyzed by oxidation with a 2% oxygen in helium blend. The acidities of each of the batches is determined as the amount of oxygen needed to oxidize the irreversibly adsorbed ammonia. The results of these tests are tabulated in Table II below.

TABLE II.—RESULTS OF ACIDITY MEASUREMENT

| Batch | 1 | 2 | 3 | 4 | 5 |
|---|---|---|---|---|---|
| Acidity at 400° C | 57 | 47 | 36 | 30 | 30 |
| Calcination temperature, °C | 550 | 600 | 650 | 700 | 750 |

Table II shows the results of the acidity measurement in arbitrary number only to be employed to show relative acid strength of these batches. From the table, it can be seen that the acid strength decreased as the calcination temperature increased. Accordingly, for this catalyst the amount of acid activity is inversely related to calcination temperature.

EXAMPLE II

The five batches of catalyst prepared in Example I are then used to make 5 corresponding dual-function catalysts by the impregnating, drying, oxidizing, reduction and sulfiding steps which have heretofore been described. The conditions utilized in these steps are the same for all the catalysts. Analyses of the 5 resulting dual-function catalysts are given in Table III.

TABLE III.—PROPERTIES OF DUAL-FUNCTION CATALYSTS

| Batch No. | Mordenite, wt. percent | Platinum, wt. percent | Chloride, wt. percent | Sulfur, wt. percent | Surface area, m²/gm. | Pore volume, ml./gm. | Pore diameter, A. |
|---|---|---|---|---|---|---|---|
| 1 | 5.0 | .82 | .80 | .16 | 167 | 0.33 | 79 |
| 2 | 5.0 | .82 | .79 | .13 | 176 | 0.32 | 73 |
| 3 | 5.0 | .74 | .73 | .09 | 162 | 0.32 | 79 |
| 4 | 5.0 | .77 | .66 | .14 | 157 | 0.30 | 76 |
| 5 | 5.0 | .75 | .61 | .06 | 134 | 0.30 | 90 |

The resulting dual-function catalysts are then separately subjected to a high stress evaluation test which is designed to measure the relation balance between the acid or cracking function and the dehydrogenation-hydrogenation function associated therewith in a process for the production of LPG and a high octane reformate.

In this test, a heavy naphtha fraction, having the properties shown in Table IV, and hydrogen are charged to a conversion zone containing a fixed bed of the catalyst to be evaluated at a LHSV of 2.0 hr.$^{-1}$, a pressure of 500 p.s.i.g., a hydrogen to hydrocarbon mole ratio of 12:1, a temperature of 896° F., for a test period of 14 hours.

TABLE IV.—PROPERTIES OF HEAVY NAPHTHA

| | |
|---|---|
| API @ 60° F. | 60.6 |
| ASTM distillation D86: | |
| IBP° F. | 250 |
| 5% | 262 |
| 10% | 265 |
| 20% | 270 |
| 30% | 275 |
| 40% | 280 |
| 50% | 285 |
| 60% | 292 |
| 70% | 303 |
| 80% | 318 |
| 90% | 336 |
| 95% | 353 |
| EBP° F. | 395 |
| Sulfur, p.p.m. | 113 |
| Total oxygen, p.p.m. | 100 |
| $N_2$, p.p.m. | <0.1 |
| Bromine index | 200 |
| A, 1 v. percent | 1 |
| O, 1 v. percent | 0 |
| P+N, 1 v. percent | 86+13 |

The results of this testing procedure for all five dual-function catalysts are given in Table V.

TABLE V.—RESULTS OF DUAL-FUNCTION CATALYST EVALUATION TESTS

| Catalyst | 1 | 2 | 3 | 4 | 5 |
|---|---|---|---|---|---|
| Calcination temperature, °C | 550 | 600 | 650 | 700 | 750 |
| Product distribution, wt. percent of feed: | | | | | |
| $H_2$ | 0.16 | 0.21 | 0.29 | 0.42 | 0.63 |
| $C_1$ | 1.7 | 1.8 | 1.8 | 1.9 | 2.0 |
| $C_2$ | 4.8 | 4.5 | 4.2 | 4.0 | 3.9 |
| $C_3$ | 13.6 | 13.1 | 12.4 | 12.0 | 11.6 |
| $IC_4$ | 11.6 | 12.2 | 11.2 | 11.3 | 10.2 |
| $NC_4$ | 14.0 | 12.7 | 13.6 | 12.2 | 11.0 |
| $IC_5$ | 9.8 | 9.9 | 10.0 | 9.0 | 8.7 |
| $NC_5$ | 6.7 | 6.6 | 6.5 | 6.1 | 5.6 |
| $C_6+$ | 38.4 | 37.6 | 40.4 | 42.0 | 45.8 |
| Composite product distribution, wt. percent of feed: | | | | | |
| $C_1+C_2$ | 6.5 | 6.3 | 6.0 | 5.9 | 5.9 |
| $C_3+C_4$ (LPG) | 39.2 | 38.0 | 37.2 | 35.5 | 32.8 |
| $C_5+$ | 54.9 | 54.1 | 56.9 | 57.1 | 60.1 |
| Octane number of $C_5+$, F-1 clear | 96.7 | 96.6 | 96.7 | 96.5 | 96.6 |

From Table V, it can be seen that the over-all results of the variation of calcination temperature is a dramatic shift of the yield structure. For example, by comparing the results with catalyst 5 with those for Catalyst 1, it is evident that changing the calcination temperature from 550° C. to 750° C., with all other variables remaining constant, results in: an increase in hydrogen production of +0.47 weight percent of feed, a decrease in LPG production of 6.4 weight percent of feed, and an increase in $C_5+$ yield of 5.2 weight percent of feed. Accordingly, since the amount of LPG production and hydrogen production here are indicative of acid activity, it is evident that the amount of acid activity, observed for these catalysts is inversely related to the calcination temperature used in the preparation thereof. This corroborates the acidity number results reported in Example I.

Moreover, these results demonstrate how calcination temperature can be utilized to shift the yield structure of a process using this type of catalyst in order to fulfill a given hydrogen production requirement. Similarly, this data indicates how this catalyst can be prepared to satisfy a specific acidity requirement.

I claim as my invention:

1. A method for preparing a hydrocarbon conversion catalyst comprising a halogen component combined with a support containing alumina and finely divided crystalline aluminosilicate particles and for simultaneously controlling the acid activity of the resulting catalyst, said method comprising the steps of:
   (a) commingling finely divided crystalline aluminosilicate particles with an aluminum hydroxyl halide sol to form a mixture thereof;
   (b) gelling the resultant mixture to form a hydrogel; and,
   (c) calcining the resulting hydrogel for a period of about 1 to about 5 hours at a constant calcination temperature selected from the range of about 500° C. to about 800° C. in inverse relation to the amount of acid activity required.

2. The method of claim 1 wherein the sol is an aluminum hydroxyl chloride sol having a weight ratio of aluminum to chloride of about 1:1 to about 1.4:1.

3. The method of claim 1 wherein the crystalline aluminosilicate is mordenite.

4. The method of claim 1 wherein hexamethylenetetraamine is added to the mixture formed in step (a) to obtain a dropping solution and wherein said gelling step comprises dropping the solution into an oil bath to make substantially spherical hydrogel particles.

5. The method of claim 1 wherein said catalyst is combined with a metallic component after said calcination step to form a dual-function catalyst and the resulting dual-function catalyst is subjected to an oxidation treatment followed by a reduction treatment both of which are conducted at a temperature of at least 25° C. lower than the calcination temperature utilized in step (c).

6. The method of claim 1 wherein said crystalline aluminosilicate particles comprise about 0.5 to about 20 weight percent of said support.

7. A method for preparing a hydrocarbon conversion catalyst, comprising about 0.01 to about 3 weight percent chlorine combined with a support containing alumina and finely divided crystalline aluminosilicate particles, and for simultaneously controlling the acid activity of the resulting catalyst, said method comprising the steps of:
   (a) commingling finely divided crystalline aluminosilicate particles with an aluminum hydroxyl chloride sol, having a weight ratio of aluminum to chloride of about 1:1 to about 1.4:1 to form a mixture thereof;
   (b) gelling the resulting mixture to form substantially spherical hydrogen particles;
   (c) aging, washing, drying, the resulting hydrogel particles; and,
   (d) calcining the resulting particles from step (c) for a period of about 1 to about 5 hours at a constant calcination temperature selected from the range of about 500° C. to about 800° C. in inverse relation to the amount of acid activity required.

8. The method of claim 7 wherein said crystalline aluminosilicate is mordenite.

9. The method of claim 7 wherein said catalyst is combined with a platinum group component after said calcination step to produce a dual-function catalyst and the resulting dual-function catalyst is thereafter subjected to an oxidation treatment followed by a reduction treatment both of which are conducted at a temperature of at least 25° C. lower than the calcination temperature selected in step (d).

References Cited

UNITED STATES PATENTS

| | | | |
|---|---|---|---|
| 3,216,923 | 11/1965 | Haensel | 252—442 X |
| 3,250,728 | 5/1966 | Miale et al. | 252—455 |
| 3,296,119 | 1/1967 | Bicek et al. | 208—139 |
| 3,318,802 | 5/1967 | Martin | 252—455 X |
| 3,365,392 | 1/1968 | Mitsche et al. | 208—139 X |
| 3,369,997 | 2/1968 | Hayes et al. | 208—139 |

DANIEL E. WYMAN, Primary Examiner

C. F. DEES, Assistant Examiner

U.S. Cl. X.R.

208—139; 252—455